Oct. 7, 1941.　　　　K. L. WOODMAN　　　　2,258,145
ELECTRIC ROASTER
Filed March 11, 1939
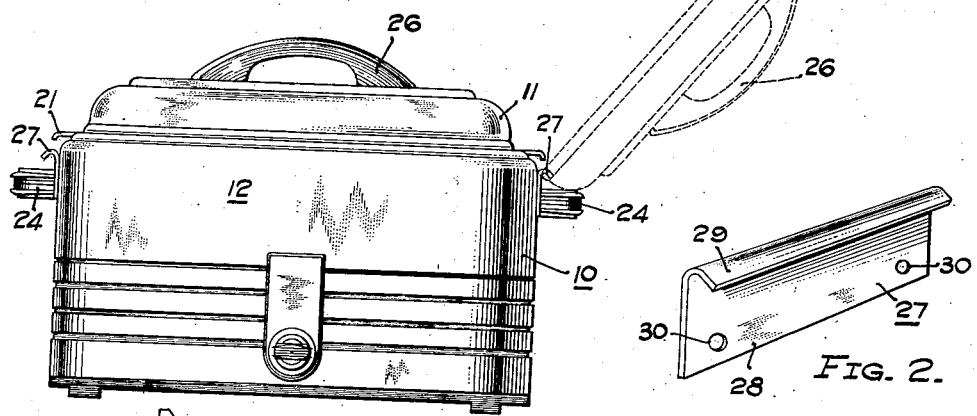
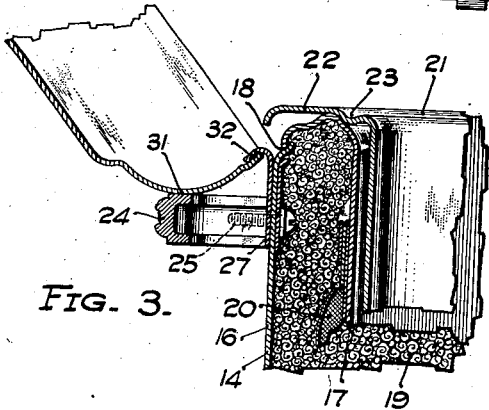
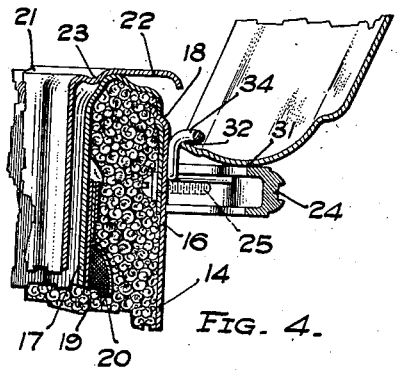
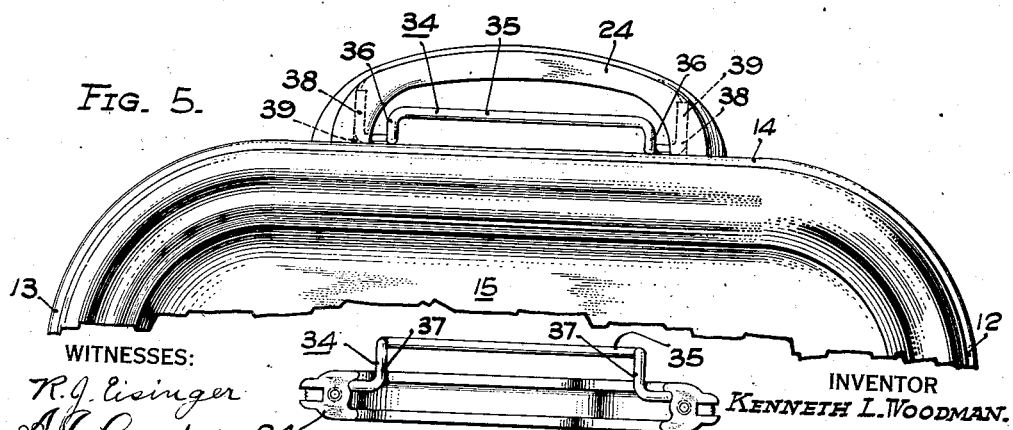
WITNESSES:
INVENTOR
KENNETH L. WOODMAN.
ATTORNEY Patented Oct. 7, 1941

2,258,145

UNITED STATES PATENT OFFICE 2,258,145

ELECTRIC ROASTER

Kenneth L. Woodman, Mansfield, Ohio, assignor to Westinghouse Electric & Manufacturing Company, East Pittsburgh, Pa., a corporation of Pennsylvania Application March 11, 1939, Serial No. 261,191

7 Claims. (Cl. 220—94)

My invention relates to an electric roaster or other receptacle having a removable cover, and it has for an object to provide improved means for holding the cover in an open position.

A more particular object is to provide a cover holding means involving a minimum of additional elements projecting from the roaster, which elements provide additional space for collection of dust and are tedious to clean.

A further object is to provide a cover holding means which may be added at slight additional cost.

The above and other objects are effected by my invention as will be apparent from the following description and claims taken in accordance with the accompanying drawing, forming a part of this application, in which:

Fig. 1 is a front elevational view of an electric roaster having incorporating cover holding means;

Fig. 2 is a perspective view of the cover retaining member;

Fig. 3 is a partial vertical sectional view showing the cover holding means;

Fig. 4 is a view, similar to Fig. 3, showing a second embodiment;

Fig. 5 is a plan view of the second embodiment; and,

Fig. 6 is an elevational view of the second embodiment as seen from the face of the side wall 14.

Referring to the drawing in detail, I show an electric roaster of rectangular form and including an open top body portion 10 and a cover 11. The body portion includes relatively long front and rear walls 12 and 13, respectively, relatively short side (or end) walls 14, and a bottom wall 15. The roaster body may be of any suitable construction, the one shown comprising an outer casing 16 and an inner well or casing 17, which are joined at the top by a connecting portion 18. The corresponding wall members of the inner and outer casings are disposed in spaced relation, and heat insulating material 19 is disposed therebetween. An electric resistance heating element 20 is wound about the inner well or casing 17 to heat the contents of the roaster. There is preferably also provided a removable inset pan 21 which fits within the inner well 17 and has a crown or flange portion 22 overlying the connecting portion 18. The crown portion 22 is formed with a groove 23 adapted to receive the edge of the cover 11 when the latter is placed thereon in closed position.

The body member is provided with horizontal handles 24 of any suitable construction. These handles are attached to the relatively flat side walls 14 below the top thereof in any suitable manner; for example, screws 25 extending through openings in the outer casing 16 may be screw threaded into the ends of the handles.

The cover 11 may be of the form shown, having its marginal portions curved downwardly to form a concave lower side and a convex upper side. A handle 26 is attached to the cover, preferably centrally thereof as shown, whereby the cover may be readily lifted with one hand.

The construction so far described was known and in extended use prior to the present invention.

In accordance with the present invention, I provide one or preferably two cover retaining members which cooperate with the handles 24 to hold the cover in open position. Such a retaining member may take the form shown at 27 in Figs. 1, 2 and 3, wherein it is formed of a sheet metal element bent to form a flat body portion 28 and a hook or retaining portion 29. The retaining member 27 is attached to the side wall 14 of the roaster body 10 in any suitable manner, for example, the body portion 28 may be clamped between the handle 24 and the outer casing 16, the body portion 28 being provided with openings 30 through which the screws 25 extend. The hook portion 29 extends horizontally along the side wall 14 and projects therefrom in a horizontal direction, preferably inclined downwardly somewhat, and it is disposed a small distance above the handle 24.

To move the cover 11 from the closed position shown in full lines in Fig. 1 to the open position shown in dotted lines, it is lifted by means of the handle 26 and swung about the upper portion of either side wall 14. The adjacent marginal portion of the cover is inserted between the adjacent handle 24 and retaining member 27, after which the cover is disengaged by the hand. The force of gravity on the cover exerts a turning moment about the portion of the cover adjacent the roaster body, which turning moment is opposed by the handle 24 and the retaining member 27. In opposing the turning moment, the top of the handle takes the downward thrust at 31 and the retaining member takes the upward thrust at 32. The hook or retaining portion 29 of the retaining member 27 is preferably disposed at such a distance above the handle 24 that the cover is held in a position inclined upwardly away from the roaster at an angle of about 50° from horizontal or 40° from vertical, as shown on the drawing. To return the cover to closed position, it is disengaged by means of the handle 26, withdrawn from the space between the handle and the retaining member and then swung about the upper portion of the side wall to closed position as will be apparent.

In Figs. 4, 5 and 6, there is shown a modified form of retaining member. This member 34 is made of a steel bar bent to the form shown on the drawing and comprising a horizontal portion 35, horizontally projecting portions 36, vertical connecting portions 37 and anchoring portions 38. The anchoring portions 38 are inserted in recesses 39 in the handle 24 before the latter is attached to the roaster body. When the handle is attached, the ends of the recesses 39 are closed by the side wall 14 so that the anchoring portions 38 are securely retained in the recesses 39. The horizontal portion 35 and the projecting portions 36 form a hook or retaining element, which is the equivalent of the hook or retaining element 29 of the first embodiment and which is adapted to engage the edge of the cover in a similar manner.

It will be apparent that the operation of the embodiment shown in Figs. 4, 5 and 6 is similar to that of the first embodiment, so that further detailed description is unnecessary. The cover is shown as inclined at an angle closer to vertical, but it may be inclined at any suitable angle.

The specific form of the retaining member 34, as shown in Figs. 4, 5 and 6, is the invention of Paul W. Green.

The cover holding means described above has numerous advantages, some of which are as follows: The cover when moved to open position is retained on the roaster body and it is not necessary to use table space which is needed for holding other utensils required in connection with the cooking activity. In this respect, it has the advantage of a hinged cover, but in addition it has the advantage that the cover may be readily removed entirely from the roaster body when it is so desired. The cover is readily manipulated with one hand. Since the cover is swung to one side rather than to the back of the roaster, it is not necessary to move the hand over the hot steam and vapors arising from the contents of the roaster as the cover is swung upwardly, as may be the case when the cover is hinged at the rear edge.

The present construction permits free removal of the inset pan 21. It supports the cover in such an open position that the condensation which may have formed on its lower surface collects in the concavity of the cover.

It will also be apparent that the above described cover holding means, since it utilizes the handles which must be provided anyway, requires a minimum of additional parts which collect dust and are tedious to clean. It is also of simple construction and low cost.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. A receptacle comprising a body portion and a cover therefor, said cover being provided with a handle, said body portion having a substantially vertical flat wall, a handle disposed horizontally on said wall below the top thereof, and a retaining member separate from but secured to said wall and having a retaining portion which is disposed a small distance above said horizontal handle and projecting outwardly over the plane of the upper edge of the handle, said outwardly projecting retaining portion and said horizontal handle cooperating to receive therebetween a marginal portion of the cover and thereby to hold the cover in an open position projecting from the receptacle.

2. A receptacle as set forth in claim 1, wherein the cover is held by said retaining portion and said horizontal handle in a position projecting from said vertical wall below the top thereof in a direction inclined upwardly away from said vertical wall.

3. A receptacle as set forth in claim 1 wherein said marginal portion of the cover is disposed at an angle thereto and wherein the cover is held by said retaining portion and said horizontal handle in an inverted position projecting from said vertical wall below the top thereof in a direction inclined upwardly away from said vertical wall.

4. A receptacle comprising a body portion and a cover therefor, said cover being provided with a handle, said body portion having a substantially vertical wall, a handle disposed horizontally on said wall below the top thereof, and a retaining member separate from but secured to said wall and having a retaining portion which is disposed a small distance above said horizontal handle and projecting outwardly over the plane of the upper edge of the handle, said outwardly projecting retaining portion and said horizontal handle cooperating to receive therebetween a marginal portion of the cover and thereby to hold the cover in an open position projecting from the body portion, the handle taking the downward thrust and the retaining portion taking the upward thrust of the turning moment imposed by the weight of the cover.

5. A receptacle comprising a body portion and a cover therefor, said cover being provided with a handle, said body portion having a substantially vertical flat wall, a handle disposed horizontally on said wall below the top thereof, and a retaining element on said wall disposed below and spaced from the top thereof and a small distance above said horizontal handle and projecting horizontally outwardly, said retaining element being of less horizontal extent than said wall and being disposed substantially between the ends of said horizontal handle, said retaining element and said horizontal handle cooperating to receive therebetween a marginal portion of the cover and thereby to hold the cover in an open position projecting from the body portion, the handle taking the downward thrust and the retaining element taking the upward thrust of the turning moment imposed by the weight of the cover.

6. A receptacle comprising a body portion having a vertical wall and an open top, a cover therefor provided with a handle and having a downwardly extending marginal portion about the periphery thereof, a handle disposed horizontally on said wall below the top thereof, a retaining element separate from said wall and secured thereto a small distance above said handle, said retaining element being disposed substantially entirely between the ends of said horizontal handle and projecting outwardly from said wall, said outwardly projecting retaining element cooperating with said horizontal handle to receive said marginal portion of the cover therebetween and to support said cover in inverted position projecting from said vertical wall in a direction inclined upwardly away from said wall, said retaining element taking the upward thrust and said horizontal handle taking the downward thrust of the turning moment imposed by the weight of the cover.

7. A receptacle as set forth in claim 4 wherein the retaining member is provided with a supporting portion which is secured between said second-mentioned handle and said wall to hold the retaining member in position.

KENNETH L. WOODMAN.